July 15, 1924.
W. G. HOWE
CORN POPPING MACHINE
Filed June 13, 1923
1,501,114
2 Sheets-Sheet 1
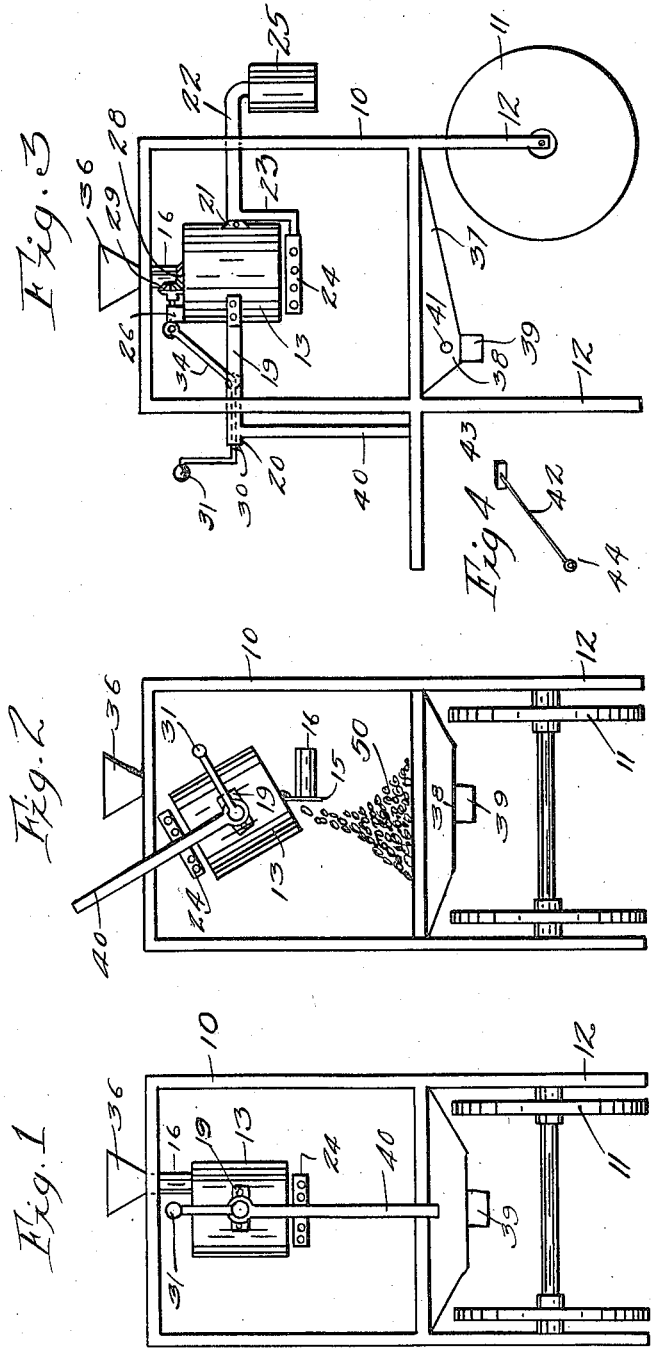

July 15, 1924. 1,501,114
W. G. HOWE
CORN POPPING MACHINE
Filed June 18, 1923 2 Sheets-Sheet 2
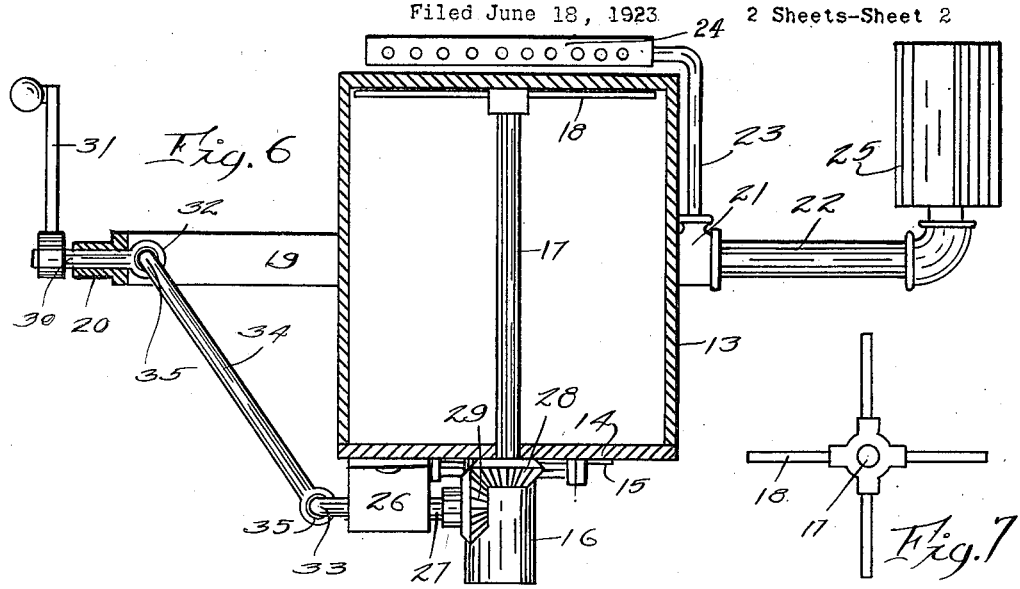
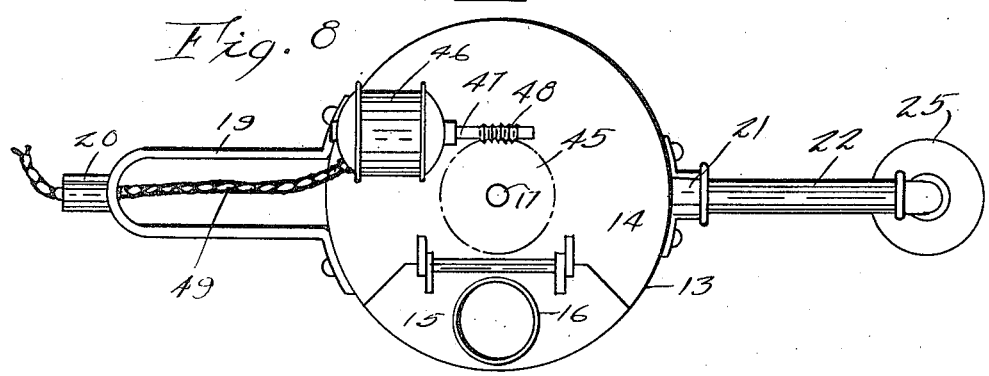
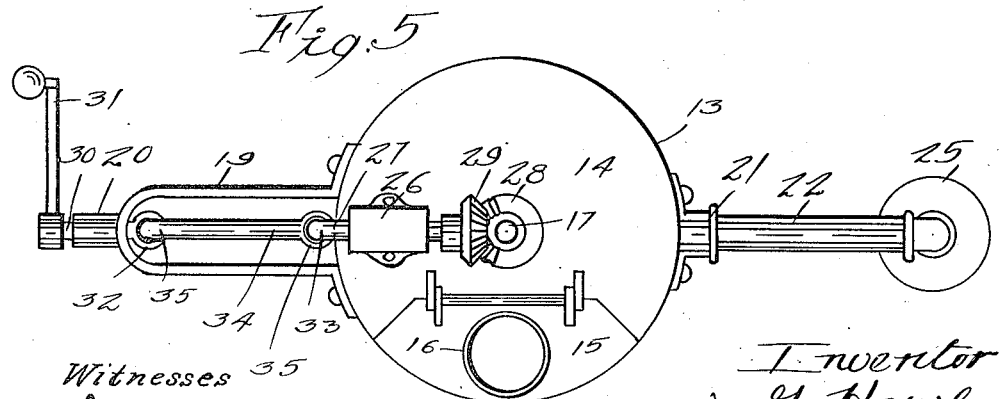
Witnesses
Geo. H. Howe
Arthur G. Payne
Inventor
W. G. Howe
By Baird Freeman
Att'ys Patented July 15, 1924.

1,501,114

UNITED STATES PATENT OFFICE.

WILLIAM GARFIELD HOWE, OF DES MOINES, IOWA.

CORN-POPPING MACHINE.

Application filed June 18, 1923. Serial No. 646,116.

*To all whom it may concern:*

Be it known that I, WILLIAM GARFIELD HOWE, a citizen of the United States, and a resident of Des Moines, in the county of Polk and State of Iowa, have invented a certain new and useful Corn-Popping Machine, of which the following is a specification.

The purpose of my invention is to provide a corn popping machine of very simple construction, which is also inexpensive to manufacture and which will not quickly wear out or easily get out of order.

More particularly, it is the purpose of my invention to provide a corn popping machine having its parts so constructed and arranged that the corn may be popped within a suitable casing, deposited in a pile for temporary storage, and discharged into sacks or other suitable receptacles without exposure to flying dust or the like and without being touched by the hands of the operator.

A further object is to provide in such a structure a casing in which the popping operation may be performed, and to mount in the casing a kettle or the like in which corn may be popped, said kettle having a burner operatively connected therewith and being capable of standing in position to receive pop corn from the outside and for popping the corn and in another position upon proper movement or rotation to discharge the popped corn.

Another purpose of my invention is to provide in such a corn popping machine, a casing and a kettle with suitable mountings for the kettle, whereby it may be handled and manipulated from the outside of the casing without the necessity for putting the hands inside the casing. This, of course, entirely obviates any necessity for immediate contact with the heated kettle or adjacent parts.

Another object is to provide the structure hereinbefore mentioned in connection with a funnel at the top of the casing arranged to coact with the kettle when the kettle is in its upright position for supplying corn to the kettle from the outside and without opening the casing.

Still a further object is to provide in connection with such a machine a casing, having in its bottom a discharge opening, and a convenient means for moving the popped corn to the discharge opening, which means is operable from outside the casing.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a front elevation of the corn popping machine with the front glass pane removed.

Figure 2 shows a similar view with the popping mechanism in a different position.

Figure 3 shows a side elevation with the glass pane removed.

Figure 4 shows a perspective view of the scraper.

Figure 5 shows a top or plan view of the corn popping mechanism.

Figure 6 shows a vertical, sectional view through the corn popping mechanism in inverted position.

Figure 7 shows a plan view of the stirrer; and

Figure 8 shows a top or plan view of a slightly modified form of the corn popping mechanism.

My improved corn popping machine comprises a frame indicated in the accompanying drawings by the reference character 10 made of metal or the like and supported at its rear end on wheels 11 and at its front end on legs 12. The frame is provided with glass panes or walls for forming an enclosed casing suitably supported.

On the inside of the casing is a corn popping mechanism, which includes a kettle 13 having at its top the fixed cover member 14 to which is hinged a movable cover member 15 from which there projects a tubular conducting member 16.

Journaled in the fixed cover member 14 is an upright shaft 17 on the lower end of which is a stirrer or agitator 18 shown in Figure 7, which is preferably made in accordance with Patent No. 1,044,706, issued November 19, 1912.

Secured to one side of the kettle 13 is a yoke 19 at the outer end of which is a hollow trunnion 20. Secured to the other side of the kettle 13 is a fitting 21 from which projects the hollow trunnion 22 aligned with the trunnion 20.

The trunnions 20 and 22 are rotatably mounted in the walls of the casing hereinbefore described.

Extending downwardly from the fitting 21 when the kettle is upright is a conducting tube 23, which leads to and supports a burner or heating element 24.

It is obvious therefore that the kettle is mounted for tilting movement on the casing and that burner rocks or tilts with the kettle.

Mounted on the outer end of the trunnion 22 outside the casing is a pressure tank or the like 25 for fuel.

I have shown in the drawings two mechanisms for operating the agitator or stirrer 18.

The hand operating mechanism includes a bracket 26 mounted on the fixed cover 14 and having the shaft 27 rotatably mounted therein. On the upper end of the shaft 17 is a beveled gear 28, which meshes with the beveled gear 29 on the shaft 27.

Rotatably mounted in the trunnion 20 is a shaft 30 on the outer end of which is a crank handle 31 having on its inner end an eye 32. On the outer end of the shaft 27 is an eye 33. A connecting shaft 34 has at its ends eyes 35 connected with the eyes 32 and 33.

It will be seen that by actuating the crank handle 31, the shaft 17 will be rotated for operating the agitator or stirrer 18.

A funnel 36 is mounted on the top of the casing and is open through the casing wall.

The lower end of the funnel 36 registers with the tubular conducting member 16 when the kettle is in upright position.

The bottom 37 of the casing may be inclined toward a common lowermost point 38 and terminates in an open downwardly projecting tube 39 adapted to be received by the open end of a pop corn sack.

Hanging downwardly from the outer end of the trunnion 20 is a handle or arm 40, which may be used for rocking or tilting the kettle 13.

In the casing is a smaller hole 41 through which extends the rod 42 having on one end a scraper member 43 and in the other end a knob or suitable handle device 44. The scraper 43 is used in scraping to the pop corn to the discharge tube 39.

In Figure 8, I have shown a slightly modified form of my invention in which the hand operating mechanism, including the shafts 27, 34 and 30 and the crank handle are removed.

The beveled gear 28 is removed and a worm wheel 45 substituted. A small motor 46 is mounted on the fixed top 14 and is provided with the shaft 47 having thereon the worm 48 arranged in mesh with the worm wheel 45.

The current conducting wires 49 extend from the motor through the hollow drum 20 to the main current wires or other source of electrical energy.

I will now explain the practical operation of my improved corn popping machine.

The heating element is made operative in any suitable way. Butter is poured through the funnel 36 and the tubular member 16 and a measured amount of pop corn is poured through the same funnel.

Where the hand operated device is used, the operator manipulates the crank 31 until the corn is popped. An experienced operator can determine when the proper time has arrived by the sound of the popping corn.

The operator then grasps the handle 40 and tilts the kettle 13 for inverting it to the position shown in Figure 2. The hinged cover member 15 will drop by gravity for discharging the pop corn 50 upon the bottom of the casing. This operation can be repeated as often as may be desired.

It is to be noted in this connection that the entire corn popping operation is performed without the necessity for the hands touching the corn and without exposing the popped corn to dust by opening the casing.

The pop corn may be removed from the casing by placing the mouth of a sack around the member 39 and pulling the pop corn to discharge position by means of the scraper 43. Thus the corn is sacked without contact with the hands and without opening the casing for letting in dust or dirt.

The operation is the same where the form of the device shown is Figure 8 is employed with the exception that the stirrer is operated by the electric motor instead of manually.

I claim as my invention:

1. In a corn popping machine, a casing, corn popping mechanism therein, means for supplying corn to said popping mechanism from outside the casing, means for causing said corn popping mechanism to discharge the popped corn into the lower part of the casing, said casing having a discharge opening adapted for discharge into the mouth of a sack, and means independent of the popping mechanism for moving the popped corn to position to be discharged through said opening.

2. In a corn popping machine, a casing having corn popping means therein and having an opening adapted for discharging popped corn into the mouth of a sack, and means independent of the popping mechanism for moving such popped corn into position to be discharged through said opening.

3. In a corn popping machine, a casing, a popping kettle therein having trunnions mounted on said casing to permit the tilting of the kettle, a heating element mounted to tilt with said kettle, and means for tilting said kettle from upright position to discharging position and vice versa.

4. In a corn popping machine, a casing, a popping kettle therein having trunnions mounted on said casing for permitting the tilting of the kettle, a heating element for co-operating with said kettle, and means for simultaneously tilting said kettle and said heating element.

5. In a corn popping machine, a support, a popping kettle thereon mounted for tilting movement and a heating element in said casing mounted for movement with said kettle.

6. In a corn popping machine, a casing, a popping kettle mounted therein for tilting movement, a heating element mounted in said casing for tilting movement, and means for imparting simultaneously tilting movement to the kettle and the heating element.

7. In a corn popping machine, a casing, a popping kettle therein, a heating element supported on said kettle, means for tiltably mounting said kettle on the casing, and means for imparting tilting movement to the kettle from outside the casing.

8. In a corn popping machine, a casing, a popping kettle thereon mounted on the trunnions on the casing for tilting movement, a hinged cover member on said kettle having an opening therein, and a tube communicating therewith supported on said cover, and a funnel device arranged at the top of said casing to register with said tube when the kettle is in upright position.

9. In a corn popping machine, a casing, a popping kettle thereon mounted on the trunnions on the casing for tilting movement, a hinged cover member on said kettle having an opening therein, and a funnel device arranged at the top of said casing to register with said opening when the kettle is in upright position.

10. In a corn popping machine, a casing, a popping kettle mounted therein on trunnions supported on said casing for permitting the kettle to be tilted, means for supplying pop corn to the kettle from outside the casing said casing having an opening in its lower part adapted for the discharge of pop corn into a sack, and means for causing corn to be discharged through said last opening, said structure being such that corn may be supplied from the outside of the casing to the corn popping mechanism, popped, discharged into the lower part of the casing and then removed from the casing and discharged into sacks without being touched by the operator and without opening the casing to expose the contents to dust and the like.

11. In a corn popping machine, a frame, a popping mechanism mounted thereon including a kettle mounted on said frame, for tilting movement and a heater device adapted to tilt with said kettle.

12. In a corn popping machine, a supporting frame, a kettle mounted thereon for tilting movement, a stirrer in said kettle, means for actuating said stirrer, a heater device, means for supporting and simultaneously tilting said kettle, said means and said heater device.

13. In a corn popping machine, a casing, a popping mechanism mounted therein including a kettle mounted on tubular trunnions supported on said casing and projecting through the walls thereon, a burner supported on said kettle, one of said trunnions forming a conducting means for fuel, a stirring mechanism, the other of said trunnions forming a conducting means for extending part of the stirring mechanism through the casing, and means for rotating said trunnions for tilting said kettle.

14. In a corn popping machine, a casing, a popping kettle therein mounted for tilting movement, a hinged cover member on said kettle, a tube supported on said cover member and designed to extend upwardly from the kettle when the kettle is in popping position, said casing having an opening for supplying corn to said tube when the kettle is in popping pisition.

Des Moines, Iowa, June 5, 1923.

WILLIAM GARFIELD HOWE.